(12) United States Patent
Yamamoto

(10) Patent No.: US 10,251,215 B2
(45) Date of Patent: Apr. 2, 2019

(54) CONTROL UNIT, CONTROL METHOD, AND RECORDING MEDIUM STORING A CONTROL PROGRAM

(71) Applicant: Naohiro Yamamoto, Kanagawa (JP)

(72) Inventor: Naohiro Yamamoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 587 days.

(21) Appl. No.: 14/719,644

(22) Filed: May 22, 2015

(65) Prior Publication Data

US 2015/0359040 A1 Dec. 10, 2015

(30) Foreign Application Priority Data

Jun. 4, 2014 (JP) .................. 2014-115687

(51) Int. Cl.
*H02M 1/00* (2006.01)
*H02M 1/32* (2007.01)
*H05B 1/02* (2006.01)
*G03G 15/00* (2006.01)
*G03G 15/20* (2006.01)
*H02M 7/217* (2006.01)

(52) U.S. Cl.
CPC ....... *H05B 1/0241* (2013.01); *G03G 15/2039* (2013.01); *G03G 15/80* (2013.01); *H02M 7/217* (2013.01); *H02M 1/32* (2013.01); *H02M 2001/007* (2013.01)

(58) Field of Classification Search
CPC .............. G03G 15/2039; G03G 15/80; G03G 2215/00983; H02J 1/00; H02J 1/04; H02J 3/32; H02J 7/0068; H02J 7/34; H02J 7/345; H02J 9/062

USPC .................................................. 219/216, 488
See application file for complete search history.

(56) References Cited

U.S. PATENT DOCUMENTS 4,243,313 A * 1/1981 Masuda ............. G03G 15/5012
399/19
4,771,312 A * 9/1988 Yanase .................. G03G 15/80
307/66

(Continued)

FOREIGN PATENT DOCUMENTS

JP 2002-278352 9/2002

*Primary Examiner* — Dana Ross
*Assistant Examiner* — Joe E Mills, Jr.
(74) *Attorney, Agent, or Firm* — Cooper & Dunham LLP

(57) ABSTRACT

A control device includes an AC-DC converter that converts power supplied from a commercial power source into DC, a DC-DC converter that supplies the DC to a fixing heater, an calculator that calculates a target DC voltage of the DC to be supplied to the fixing heater, based on detected temperature of the fixing heater, an overcurrent detection unit that outputs an interruption signal when an overcurrent detection value is detected in a circuit including a switching element, and a controller that calculates switching time for switching the switching element so that an output of the DC-DC converter reaches the target DC voltage. When the interruption signal is output causing stopping of the switching of the switching element, the controller causes the calculator not to calculate the switching time to continuously use the previously calculated switching time after resuming switching of the switching element at a next switching cycle.

5 Claims, 8 Drawing Sheets

(56) References Cited

U.S. PATENT DOCUMENTS

| | | | |
|---|---|---|---|
| 2002/0163569 A1* | 11/2002 | Shibuya | B41J 11/0075 347/101 |
| 2003/0099479 A1* | 5/2003 | Nakafuji | G03G 15/2003 399/70 |
| 2004/0086293 A1* | 5/2004 | Atsushi | G03G 15/2039 399/69 |
| 2005/0169658 A1* | 8/2005 | Hanamoto | G03G 15/2039 399/88 |
| 2005/0169659 A1* | 8/2005 | Koyama | G03G 15/5004 399/88 |
| 2006/0022650 A1* | 2/2006 | Vinciarelli | H02M 1/36 323/266 |
| 2006/0033473 A1* | 2/2006 | Stanzel | H02J 7/022 320/128 |
| 2006/0099003 A1* | 5/2006 | Namiki | G03G 15/80 399/88 |
| 2006/0165429 A1* | 7/2006 | Satoh | G03G 15/2039 399/69 |
| 2007/0059016 A1* | 3/2007 | Sato | G03G 15/80 399/88 |
| 2007/0059017 A1* | 3/2007 | Omura | G03G 15/5004 399/88 |
| 2007/0064027 A1* | 3/2007 | Seo | G03G 15/2039 347/6 |
| 2007/0088963 A1* | 4/2007 | Nakaya | G03G 15/2039 713/300 |
| 2007/0122174 A1* | 5/2007 | Yamamoto | G03G 15/5004 399/88 |
| 2008/0075494 A1* | 3/2008 | Matsuo | G03G 15/5004 399/70 |
| 2008/0224540 A1* | 9/2008 | Sugawara | G03G 15/80 307/46 |
| 2008/0260415 A1* | 10/2008 | Sone | G03G 15/2039 399/88 |
| 2009/0027931 A1* | 1/2009 | Usui | H02J 9/061 363/84 |
| 2009/0072781 A1* | 3/2009 | Takahashi | G03G 15/80 320/101 |
| 2010/0046973 A1* | 2/2010 | Hachisuka | G03G 15/2039 399/69 |
| 2010/0104298 A1* | 4/2010 | Hachisuka | G03G 15/2039 399/33 |
| 2010/0254726 A1* | 10/2010 | Endo | G03G 15/5004 399/69 |
| 2011/0267851 A1* | 11/2011 | Nagel | H02M 3/155 363/37 |
| 2011/0280596 A1* | 11/2011 | Shimura | G03G 15/205 399/33 |
| 2012/0112720 A1* | 5/2012 | Remmert | H02M 3/28 323/283 |
| 2012/0159228 A1* | 6/2012 | Arimoto | G03G 15/5004 713/340 |
| 2012/0288288 A1* | 11/2012 | Imaizumi | G03G 15/80 399/38 |
| 2013/0111237 A1* | 5/2013 | Inukai | H02M 7/06 713/320 |
| 2013/0214606 A1* | 8/2013 | Hasebe | G03G 15/5004 307/80 |
| 2013/0236205 A1* | 9/2013 | Kataoka | G03G 15/80 399/88 |
| 2014/0147157 A1* | 5/2014 | Hiraguchi | G03G 15/5004 399/88 |
| 2014/0169811 A1* | 6/2014 | Shimura | G03G 15/2039 399/33 |
| 2014/0210264 A1* | 7/2014 | Inukai | H02J 9/061 307/23 |
| 2014/0233266 A1* | 8/2014 | Inukai | H02M 3/33507 363/21.01 |
| 2014/0254210 A1* | 9/2014 | Hayasaki | G03G 15/80 363/21.12 |
| 2014/0301117 A1* | 10/2014 | Hirabayashi | G03G 15/5004 363/21.15 |
| 2014/0328098 A1* | 11/2014 | Hosotani | H02M 3/33507 363/89 |
| 2014/0341604 A1* | 11/2014 | Yamamizu | G03G 15/80 399/88 |
| 2014/0354074 A1* | 12/2014 | Sadakata | H02M 1/4225 307/104 |
| 2014/0362605 A1* | 12/2014 | Jang | H02M 3/3353 363/17 |
| 2015/0138842 A1* | 5/2015 | Knoll | H02M 7/217 363/21.01 |
| 2015/0338802 A1* | 11/2015 | Okano | G03G 15/2053 399/330 |

* cited by examiner

CONTROL UNIT, CONTROL METHOD, AND RECORDING MEDIUM STORING A CONTROL PROGRAM

CROSS-REFERENCE TO RELATED APPLICATION

This patent application is based on and claims priority pursuant to 35 U.S.C. § 119(a) to Japanese Patent Application No. 2014-115687, filed on Jun. 4, 2014 in the Japan Patent Office, the entire disclosure of which is hereby incorporated by reference herein.

BACKGROUND

Technical Field

The present invention relates to a control unit, a control method, and a non-transitory recording medium storing a control program.

Background Art

Electrophotographic image forming apparatuses that includes a power supply configuration that converts commercial power into DC using a rectification smoothing circuit, generates DC voltage supplied to a fixing heater using a DC-DC converter for heater, and generates DC voltage supplied to a CPU and a HDD on a controller board and actuators such as motors using a DC-DC converter for load are known. In the power supply configuration described above, control units that control temperature, voltage, and current of the fixing heater are known.

For example, an image forming apparatus that includes a power supply that controls a DC-DC converter stabilizing temperature, current, and voltage aiming at both reducing effect on power supply environment and shortening start-up time as the first purpose, reducing temperature ripple of the fixing heater as the second purpose, protect the fixing heater or its power supply circuit from over-current as the third purpose, and saving energy as the fourth purpose is known.

SUMMARY

An example embodiment of the present invention provides a novel control device that includes an AC-DC converter that converts power supplied from a commercial power source into DC, a DC-DC converter that supplies the DC to a fixing heater, an calculator that calculates a target DC voltage of the DC to be supplied to the fixing heater, based on detected temperature of the fixing heater, an overcurrent detection unit that outputs an interruption signal when an overcurrent detection value is detected in a circuit including a switching element, and a controller that calculates switching time for switching the switching element so that an output of the DC-DC converter reaches the target DC voltage. When the interruption signal is output causing stopping of the switching of the switching element, the controller causes the calculator not to calculate the switching time to continuously use the previously calculated switching time after resuming switching of the switching element at a next switching cycle.

Further example embodiments of the present invention provide a control method and a non-transitory recording medium storing a control program.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

DETAILED DESCRIPTION

Figure 1:
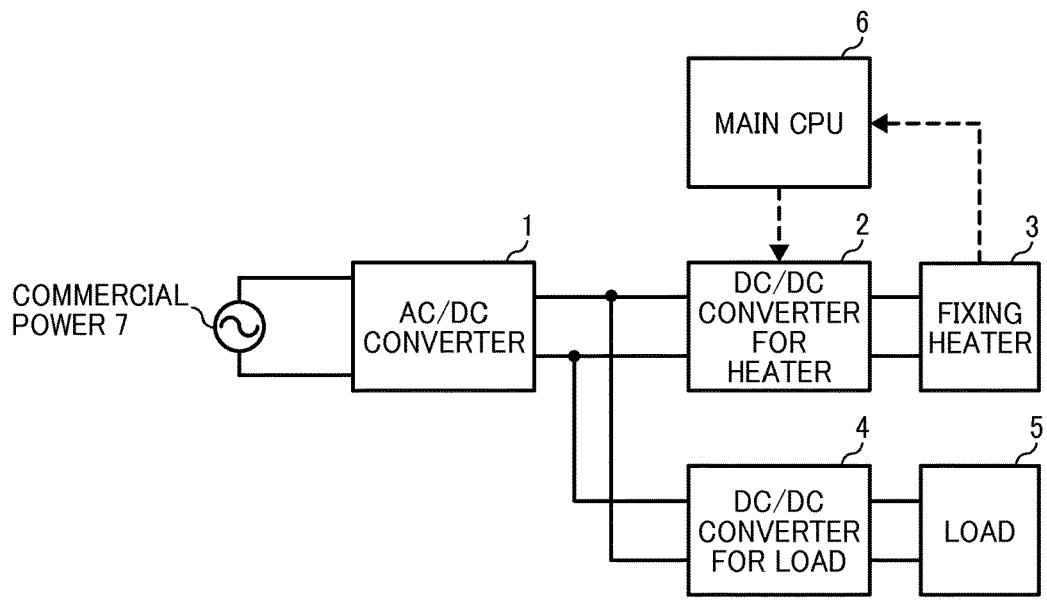
FIG. 1 is a schematic block diagram illustrating a control unit as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result. In figures, same symbols are assigned to same or corresponding parts, and their descriptions are simplified or omitted appropriately.

In controlling voltage of the power supply for the known fixing heater, fixed voltage set value (i.e., 100 V) is output. In controlling temperature, the power supply for the fixing heater is turned off if the temperature exceeds predetermined degrees, and that makes temperature ripple of the fixing heater large.

In controlling current, current value is read at a control frequency. In this case, the heater temperature is low just after starting heating, and incoming current is live since the heater impedance is low. If the incoming current rises quicker than the control frequency, it is impossible to suppress the incoming current, and overcurrent is live through circuit parts.

In the following embodiment, a control unit that represses temperature ripple by changing voltage supplied to the fixing heater in accordance with the heater temperature and prevents current larger than a predetermined value from going in the circuit or the heater is provided.

FIG. 1 is a schematic block diagram illustrating a control unit in this embodiment. The control units supplies DC to the fixing heater used in the image forming apparatus. The control unit converts AC commercial power into DC using an AC-DC converter 1 and supplies DC to a DC-DC converter for heater 2 and a DC-DC converter for load 4. The AC-DC converter 1 includes a switching power supply such as a rectification smoothing circuit and a power-factor improving circuit. The DC-DC converter for load 4 supplies predetermined voltage to load 5 except the fixing heater 3 in the image forming apparatus. More specifically, the DC-DC converter 4 supplies 24 V to the CPU, 12 V to the HDD, 5 V to the sensor, and 3.3 V to the actuator.

The main CPU 6 as a calculation unit detects temperature of the fixing heater 3 by reading output of the temperature sensor of the fixing unit using the AC-DC converter and calculates a target voltage value of the DC-DC converter for heater 2 using difference between a target temperature value and the detected temperature. The DC-DC converter for heater 2 performs constant voltage control that voltage supplied to the fixing heater 3 becomes target voltage input by the main CPU 6 and performs current control so that the current does not exceed a predetermined value.

Figure 2:
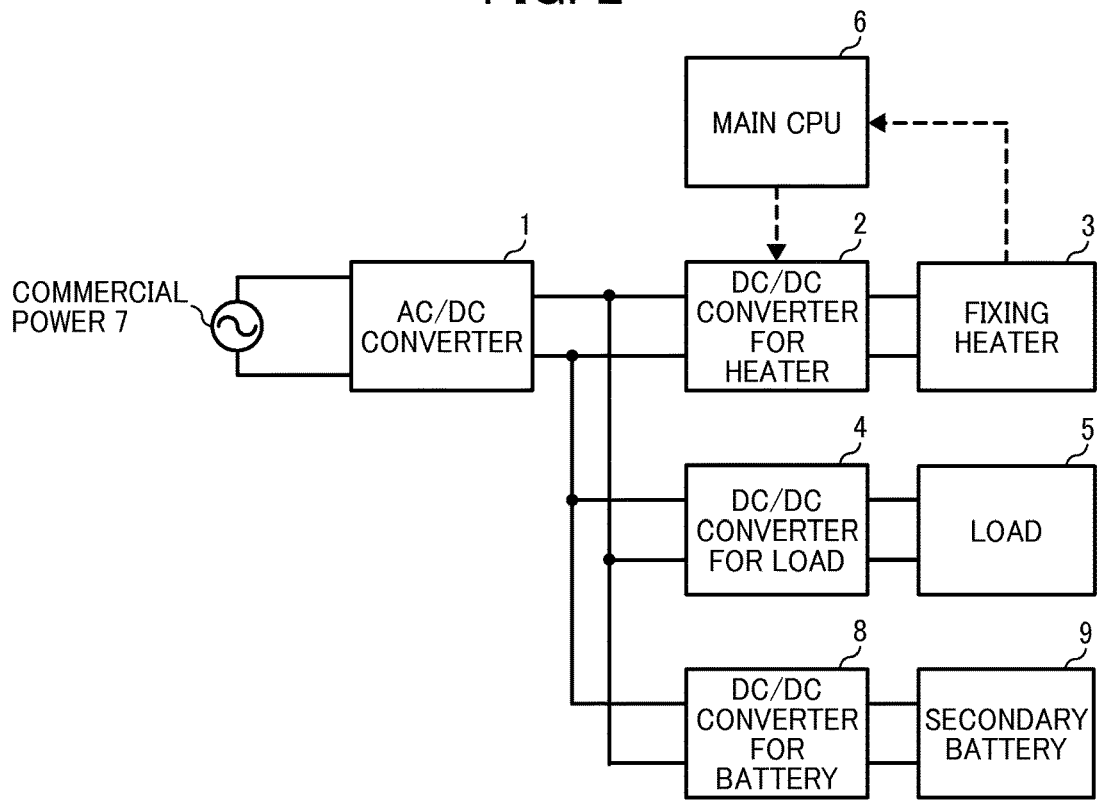
FIG. 2 is a schematic block diagram illustrating another control unit as an embodiment of the present invention.

An example of the image forming apparatus in this embodiment can further include a secondary battery 9 and a DC-DC converter for battery 8 as shown in FIG. 2. The DC-DC converter for battery 8 is a power supply that charges/discharges the secondary battery 9. By adopting the configuration described above, in case of using the secondary battery 9 as the power supply of the image forming apparatus, since it is unnecessary to convert DC voltage of the secondary battery 9 into AC voltage, it is possible to achieve high-efficiency and reduce the circuit scale. Examples of the secondary battery 9 are a lithium-ion battery, a nickel-hydrogen battery, a natrium-sulfur battery, a lead battery, and a capacitor etc.

Figure 3:
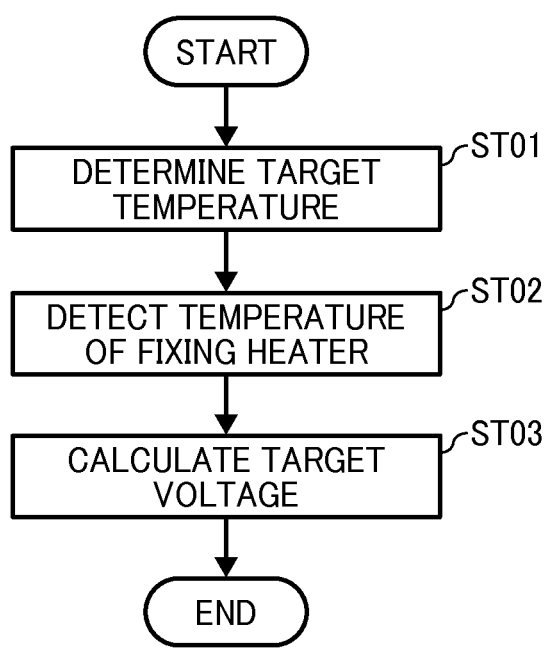
FIG. 3 is a flowchart illustrating a temperature control process as an embodiment of the present invention.

Next, temperature control of the fixing heater 3 by the main CPU 6 is described below with reference to a flowchart in FIG. 3. The main CPU 6 sets a predetermined value stored preliminarily to a temperature target value of the fixing heater 3 considering image forming conditions such as operating modes of the image forming apparatus (e.g., startup mode, standby mode, and image forming mode etc.) and paper type etc. in ST01. Subsequently, the main CPU 6 detects temperature of the fixing heater 3 by reading an output value of the temperature sensor that controls temperature of the fixing heater using an A-D converter in ST02. The main CPU 6 calculates a voltage value supplied to the fixing heater 3 using difference between the detected temperature of the fixing heater and the target value. Examples of the calculation are proportional control of the difference, integral control of the difference, differential control of the difference, and their combinations.

Figure 4:
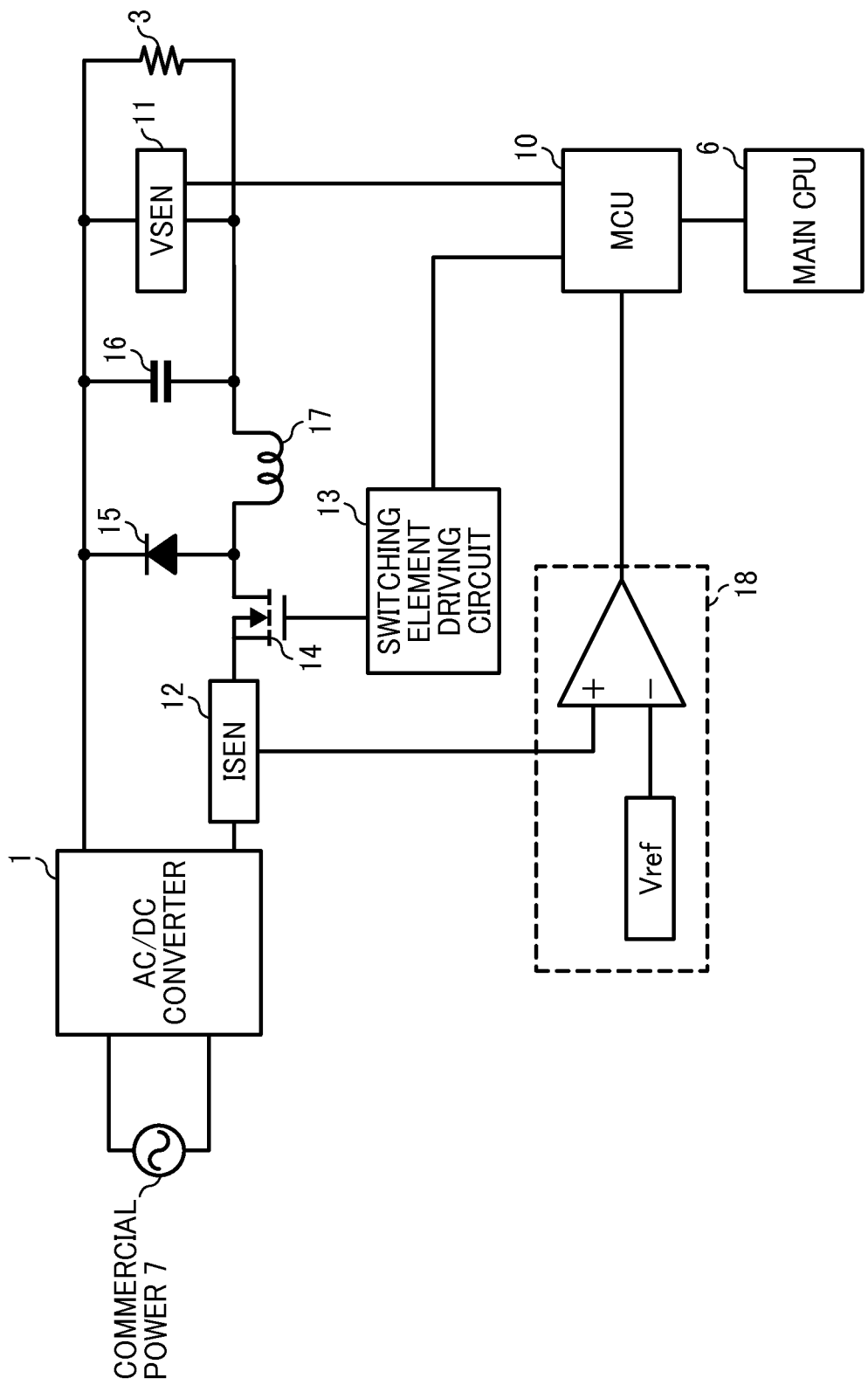
FIG. 4 is a schematic block diagram illustrating a DC-DC converter for heater as an embodiment of the present invention.
Figure 5:
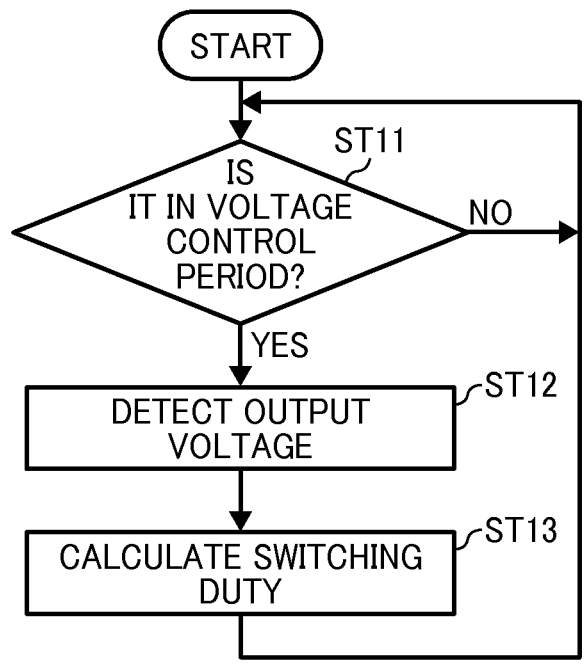
FIG. 5 is a flowchart illustrating a constant voltage control process as an embodiment of the present invention.

Next, the DC-DC converter for heater 2 is described below taking a rectification back converter method as an example with reference to FIG. 4. A diode rectification back converter method consists of the fixing heater 3, a diode 15, a capacitor 16, an inductor 17, and a switching element 14. Examples of the switching element 14 are FET and IGBT etc. The diode rectification back converter method further includes a voltage detection unit 11, a current detection unit 12, and an over-current detection unit 18. The DC-DC converter for heater 2 is controlled by digital control, and a MCU 10 as a control unit is included as a calculation unit. Other calculation elements such as DSP etc. can be used as the control unit. After the main CPU 6 inputs the target voltage to the MCU 10, the MCU 10 controls the DC-DC converter for heater 2 performing the constant voltage control. The constant voltage control is described below with reference to a flowchart in FIG. 5.

After the MCU 10 determines that it is in a predetermined voltage control frequency in ST11, the MCU 10 detects the output voltage by reading the output value of the voltage detection unit 11 input to the A-D converter in ST12. Subsequently, the MCU 10 calculates duty of the switching element 14, on time of the switching element 14, or off time of the switching element 14 using difference between the target voltage and the detected voltage. Examples of the calculation are proportional control of the difference, integral control of the difference, differential control of the difference, and their combinations. The MCU 10 drives the switching element 14 at a predetermined frequency via the switching element driving circuit 13. It is preferable to set a switching frequency at a duty calculating frequency divided by n (i.e., n is integer). For example, the calculating frequency is 10 KHz, and the switching frequency is 50 KHz.

Figure 6:
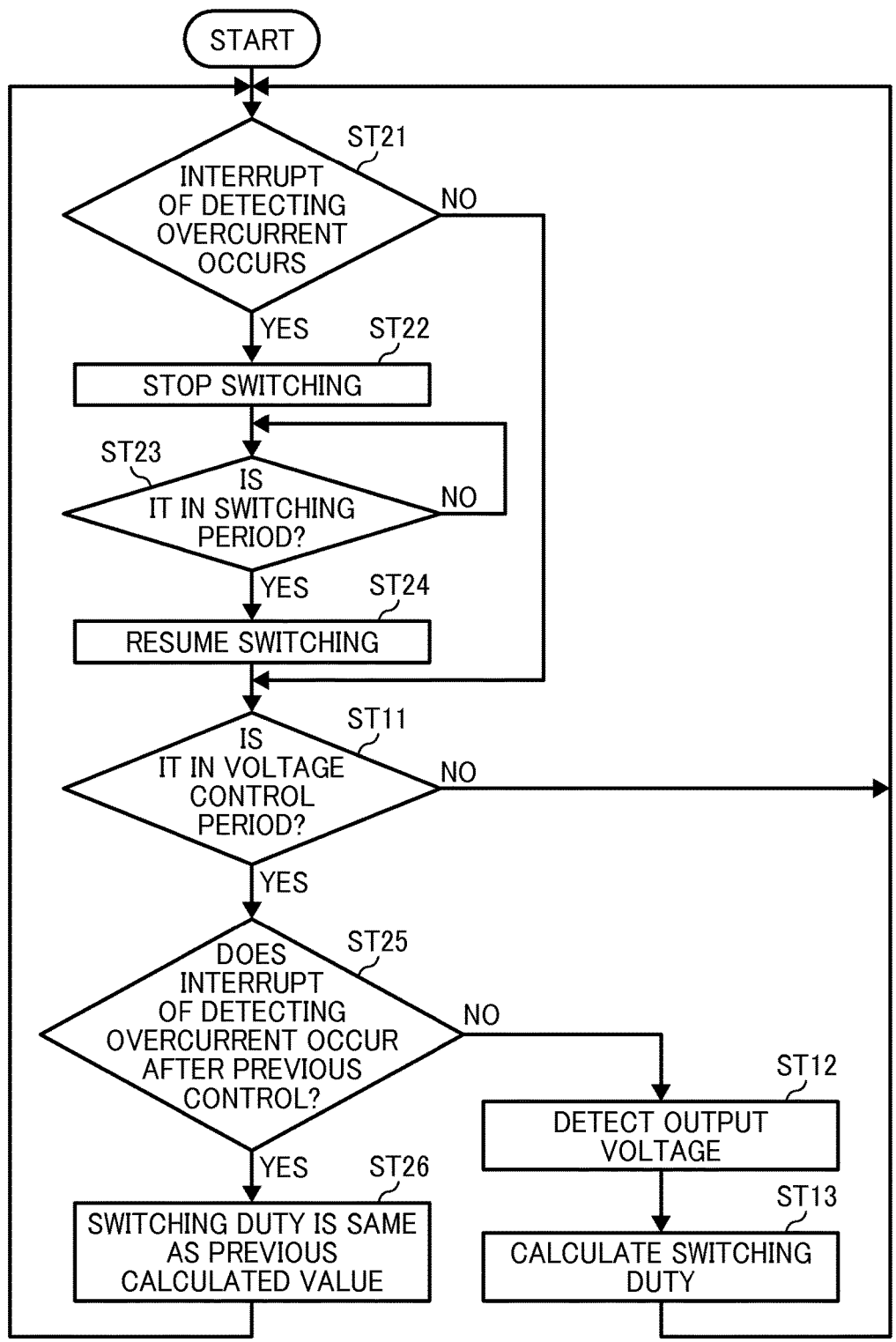
FIG. 6 is a flowchart illustrating a current control process as an embodiment of the present invention.

Since impedance of the fixing heater 3 varies in accordance with temperature, it is possible that large current goes through the fixing heater 3 in supplying voltage. Especially, in case of starting heating the fixing heater 3, incoming current goes through the fixing heater 3 since the impedance of the fixing heater 3 is low. The large current can cause damages to circuit elements such as the switching element 14 and the diode 15 etc. and affect power environment such as fluctuation in voltage of the commercial power 7 etc. To cope with this issue, the DC-DC converter for heater 2 performs current control to repress the overcurrent at the same time as voltage control. The current control is described below with reference to a flowchart in FIG. 6.

The current detection unit 12 outputs voltage in accordance with a detected current value by detecting current in the circuit. For example, a current sensor that uses a shunt resistance or Hall element can be used as the current detection unit 12. In FIG. 4, the current detection unit 12 is located at a position where current that goes through the switching element 14 can be detected. However, it is possible to locate the current detection unit 12 at any position where current is detected, and it is possible to locate the current detection unit 12 at a position where current that goes through the diode 15, inductor 17, or the fixing heater 3 can be detected. The output of the current detection unit 12 is input into the overcurrent detection unit 18. The overcurrent detection unit 18 detects that a current value exceeds a predetermined value and outputs an interrupt signal to an external interrupt terminal of the MCU 10 in ST21. As shown in FIG. 4, it is possible that the configuration of the overcurrent detection unit 18 uses a comparator and detects overcurrent if the output of the current detection unit 12 exceeds a predetermined voltage value Vref.

If the overcurrent detection unit 18 outputs the interrupt signal to the MCU 10, the MCU 10 stops switching in ST22. Accordingly, it is possible to control the apparatus so that current larger than the detection value by the overcurrent detection unit 18 does not go through. In case of stopping switching, if the next switching frequency is recognized in ST23, the switching is resumed in ST24. It is possible to resume switching at the next duty calculating frequency. If the duty calculating frequency is slower than the switching frequency, the output voltage gets lower while the switching is stopped. Therefore, if the switching is resumed at the duty calculating frequency, the voltage value at the time of detecting overcurrent gets lower, and it takes longer to heat the fixing heater 3. Since it is desirable that the heating time of the heater is shorter, it is preferable to control the apparatus so that the switching is resumed at the switching frequency.

Next, the process proceeds to ST11, and the process goes back to ST21 if the MCU 10 determines that it is not a predetermined voltage control frequency. If it is determined that it is in the predetermined voltage control frequency, it is determined whether or not the overcurrent detection interrupt has been generated since the previous control at the duty calculating frequency in ST25. If the interrupt has been generated, calculation of the switching duty is not performed, and the switching duty is not changed from the previous calculated value. Since the switching is stopped while the overcurrent is detected, the voltage does not rise, and error gets larger. As a result, the switching duty of the calculation result becomes larger excessively, and the output voltage overshoots its target value. The switching duty is not changed to prevent the overshoot from occurring. In case of not generating interruption, the process proceeds to ST13 from ST12.

In a known technology, the switching is stopped after detecting overcurrent just like this embodiment. However, in the known technology, it is desired to include a latch circuit to stop and start switching. By contrast, in this embodiment, it is unnecessary to include the latch circuit. Therefore, it is possible to simplify the circuit, and cost can be reduced. In addition, since the known technology described above aims at protecting from overcurrent in case of short circuit, the known technology fails to describe the process of calculating switching duty in detecting overcurrent, and it is difficult to prevent an overshoot of output voltage from occurring. By contrast, in this embodiment, it is possible to prevent the overshoot from occurring by not updating switching duty in detecting overcurrent.

Figure 7:
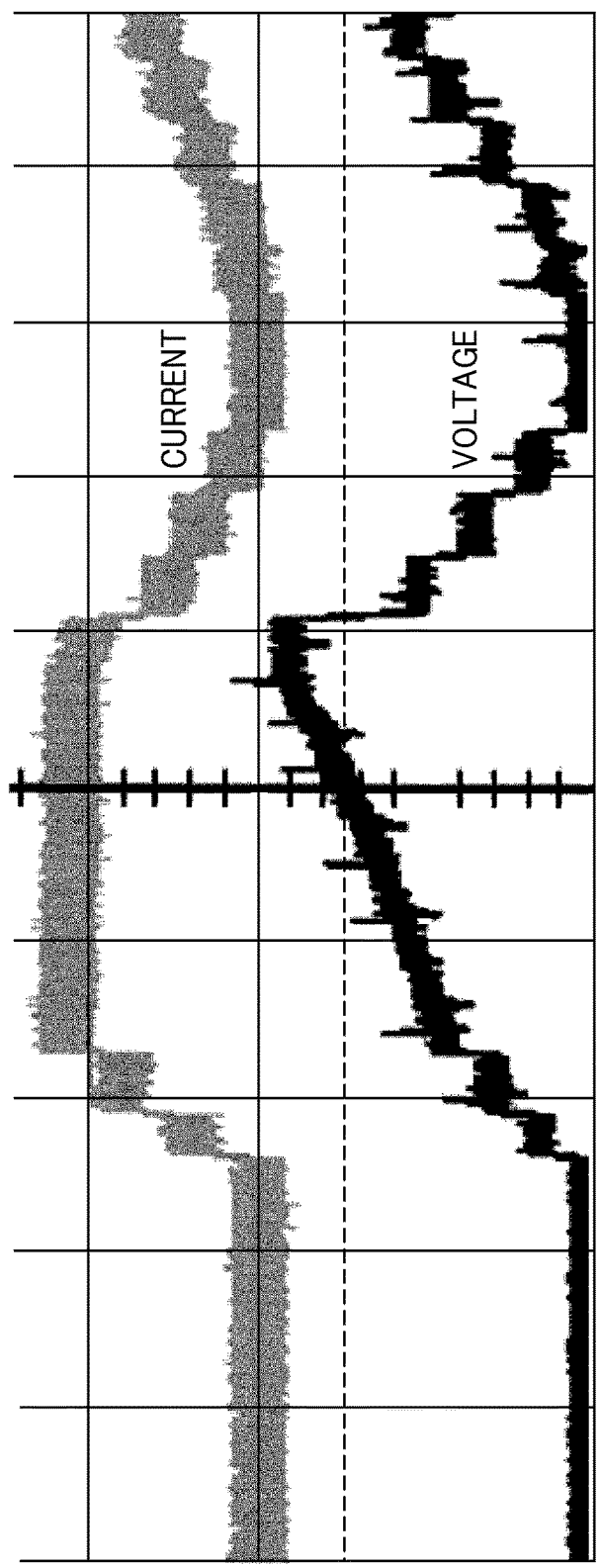
FIG. 7 is a diagram illustrating a result checking an effect as an embodiment of the present invention.

Next, an effect considering the heater as a load in this embodiment is described below based on FIG. 7. In FIG. 7, voltage and current vary stepwise. This is a result that the main CPU 6 detects the heater temperature, calculate the target voltage, and control the output voltage so that the output voltage becomes the target voltage. In this case, the width of the step is equal to the calculation frequency of the target voltage. In addition, as the voltage increases consecutively, the current remains constant for a certain period of time. This is a result of constant current control. Since impedance of the fixing heater 3 increases as the fixing heater is heated, the voltage increases consecutively with the constant current. As described above, in this embodiment, in the image forming apparatus that DC is supplied to the fixing heater 3, it is possible to reduce temperature ripple by controlling voltage supplied to the fixing heater 3 in accordance with the heater temperature and prevent current larger than a predetermined value from going through the circuit or the heater.

Figure 8:
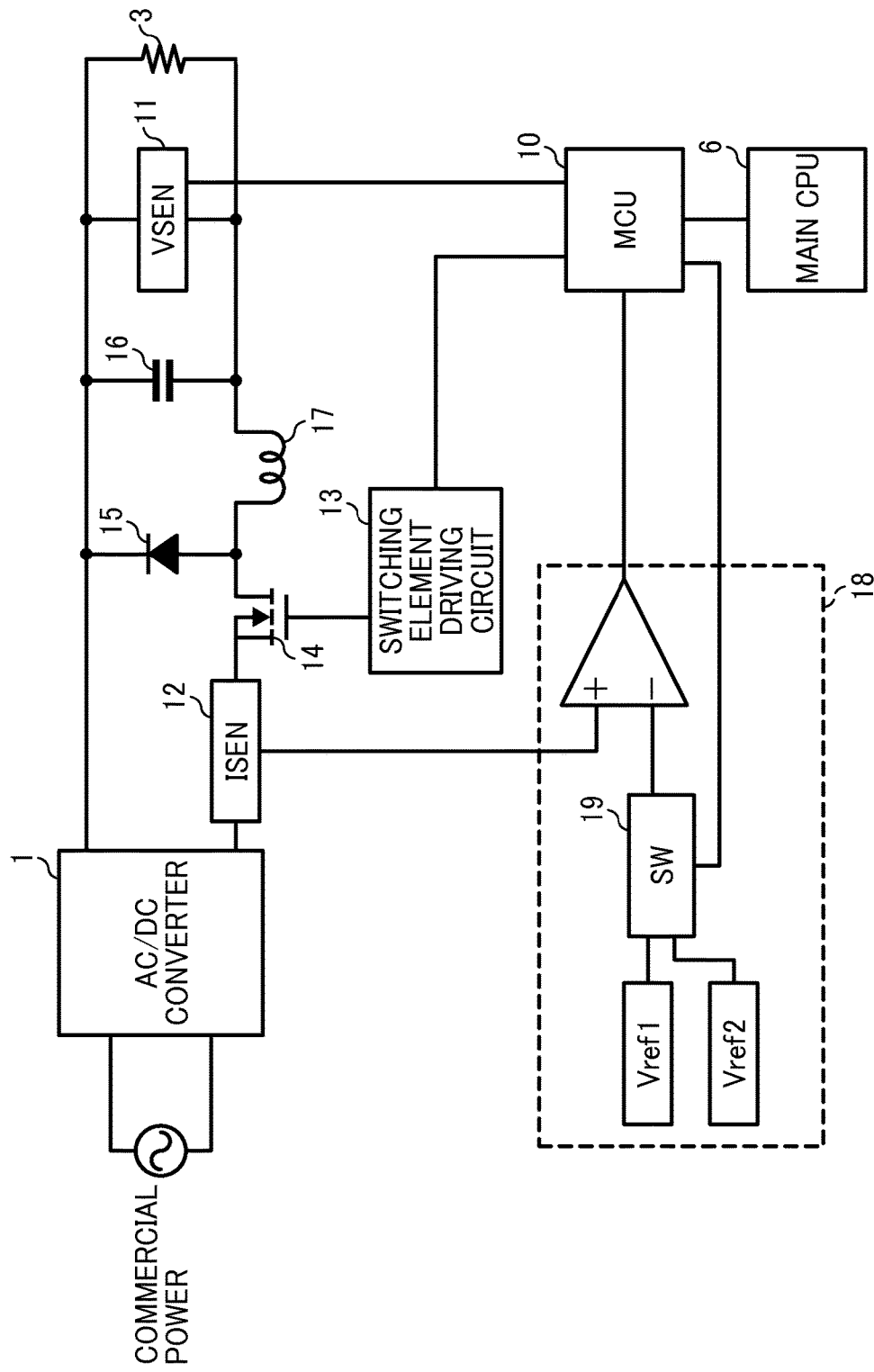
FIG. 8 is a schematic diagram illustrating a control device that can change a current control value as another embodiment of the present invention.

Next, a configuration that can modify a current control value in this embodiment is described below with reference to FIG. 8. In this case, an overcurrent detection value is modified by including a switch 19 in the overcurrent detection unit 18 and controlling the switch 19 by the MCU 10, and the current control value of the DC-DC converter for heater 2 is modified. A transistor and FET etc. can be used as the switch 19. Since it is desired that the temperature of the fixing heater 3 rise quickly, it is necessary to supply large current to the heater. However, if large current always goes through the circuit elements such as the switching element 14 etc., it is necessary to use circuit elements with large current capacity, and that increases cost. In the configuration described above, it is possible to increase current for a short period of time without increasing the current capacity of the circuit elements. As a result, by increasing the current control value at starting up the fixing heater 3, it is possible to start up the fixing heater 3 quickly without increasing the current capacity of the elements.

Figure 9:
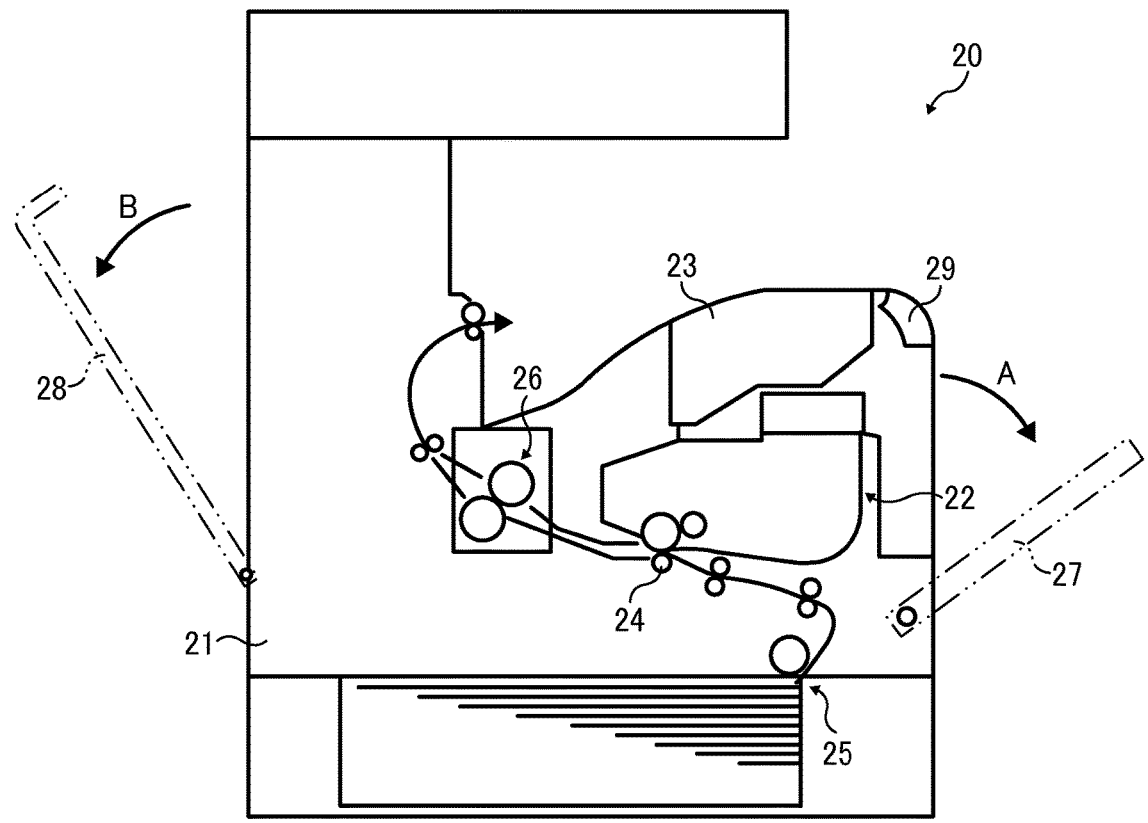
FIG. 9 is a diagram illustrating an image forming apparatus as an embodiment of the present invention.

Next, the image forming apparatus that the control unit in this embodiment can be applied is described below. FIG. 9 is a diagram illustrating a monochrome printer (hereinafter referred to as "printer") as an image forming apparatus in this embodiment. A printer 20 includes a main unit 21, a process cartridge 22 that includes a developing device that toner is encapsulated, a writing device 23, a transfer roller 24, a paper feeding unit 25, and a fixing unit 26 etc., and the printer 20 forms an image in accordance with a general electrophotographic image formation process.

An openable and closable front cover 27 and back cover 28 are located on the main unit 21. Components such as the process cartridge 22, the writing device 23, the transfer roller 24, the paper feeding unit 25, and the fixing unit 26 etc. are located in the main unit 21 basically. A controller (not shown in figures) controls and performs an image formation process using the process cartridge 22, the writing device 23, the transfer roller 24, the paper feeding unit 25, and the fixing unit 26. Therefore, these components transfer/receive various information to/from the controller via signal lines.

A display panel 29 as a display unit is located on the upper part of the front cover 7 located on the front side of the main unit 101. The display panel 29 is connected to the controller (not shown in figures) via the signal lines etc., and the display panel 29 is configured so that various information to be reported is displayed. For example, if it is desired to exchange the process cartridge 22, the controller displays a message that the process cartridge 22 should be exchanged on the display panel 29. If the message for exchanging the process cartridge 22 is displayed, the front cover 27 on the main unit 21 is opened in the direction shown by arrow A, and the process cartridge 22 is replaced by user operation. If a message for paper jam is displayed on the display panel 29, the front cover 27 is opened in direction A or the back cover 28 on the opposite side to the front cover 27 is opened in direction B, and the jammed paper (not shown in figures) as a recording medium is removed by user operation. The controller in this embodiment controls the operation of the fixing unit 26.

In the configuration described above, the MCU 10 performs control that DC voltage supplied to the fixing heater 3 is controlled in accordance with the temperature of the fixing heater 3 and switching operation of the DC-DC converter for heater 2 is stopped if in-circuit current of the DC-DC converter for heater 2 exceeds a predetermined value. As a result, since it is possible to reduce the temperature ripple and prevent current larger than the predetermined value from going through the fixing heater 3, it is possible to prevent incoming current from occurring.

In addition, since the MCU 10 controls the switch 19 that modifies the overcurrent detection value, it is possible to modify the current control value easily. In addition, since the MCU 10 increases the overcurrent control value in starting up the fixing heater 3, it is possible to start up the fixing heater 3 quickly. Furthermore, since the secondary battery 9 and the DC-DC converter for battery 8 are included, it is possible to achieve high-efficiency and save energy in case of including the secondary battery 9.

The present invention is not limited to the details of the example embodiments described above, and various modifications and improvements are possible.

For example, the image forming apparatus that the embodiment is applied can be not only the type of the image forming apparatus described above but also other types of the image forming apparatus. That is, the image forming apparatus that the embodiment is applied can be single-function devices such as a printer and a facsimile machine, multifunction peripherals of those functions, or monochrome or color multifunction peripherals of those functions. Other than that, the image forming apparatus that the embodiment is applied can be an image forming apparatus used for forming an electric circuit or an image forming apparatus used for forming a predetermined image in the field of biotechnology.

Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC) and conventional circuit components arranged to perform the recited functions.

What is claimed is:

1. A control device, comprising:
    an AC-DC converter to convert power supplied from a commercial power source into DC;
    a DC-DC converter to supply the DC to a fixing heater;
    a calculator configured to calculate a target DC voltage of the DC to be supplied by the DC-DC converter to the fixing heater, based on a detected temperature of the fixing heater detected by a temperature sensor;
    an overcurrent detection unit configured to output an interruption signal when an overcurrent detection value is detected in a circuit including a switching element; and
    a controller configured to control an output of the DC-DC converter and configured to calculate switching time for switching the switching element so that the output of the DC-DC converter reaches the target DC voltage, wherein when the controller receives the interruption signal output by the overcurrent detection unit, the controller stops the switching of the switching element and the controller does not recalculate the switching time and instead continuously uses the previously calculated switching time after resuming switching of the switching element at a next switching cycle.

2. The control device according to claim 1, further comprising a switch configured to modify the overcurrent detection value under control of the controller.

3. The control device according to claim 1, wherein the controller increases the overcurrent detection value in starting up the fixing heater.

4. The control device according to claim 1, further comprising:
    a secondary battery; and
    a DC-DC converter connected to the AC-DC converter and the secondary battery.

5. An image forming apparatus to perform an image forming process, comprising:
    the control device according to claim 1; and
    a fixing unit including the fixing heater and the temperature sensor, wherein
    the control device controls the image forming process and controls the DC supplied to the fixing heater.

* * * * *